UNITED STATES PATENT OFFICE.

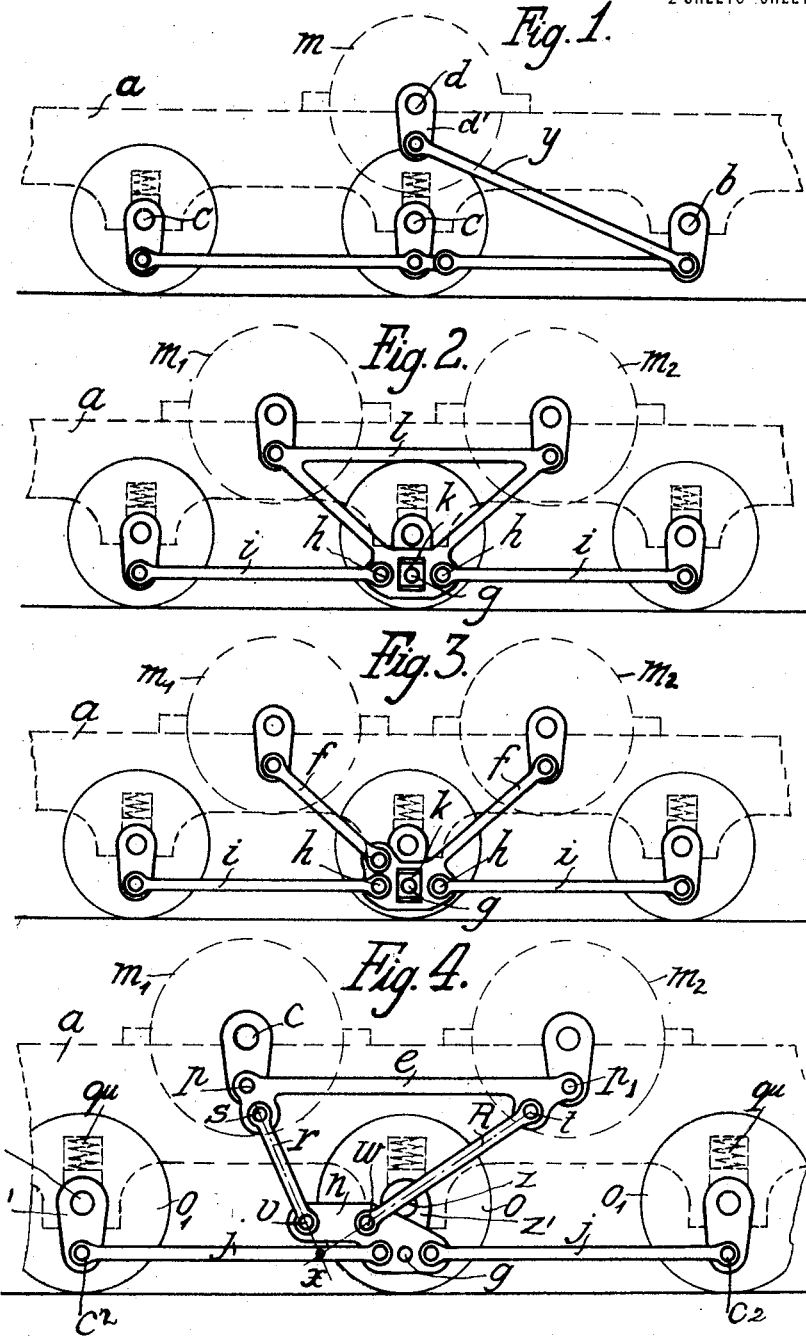

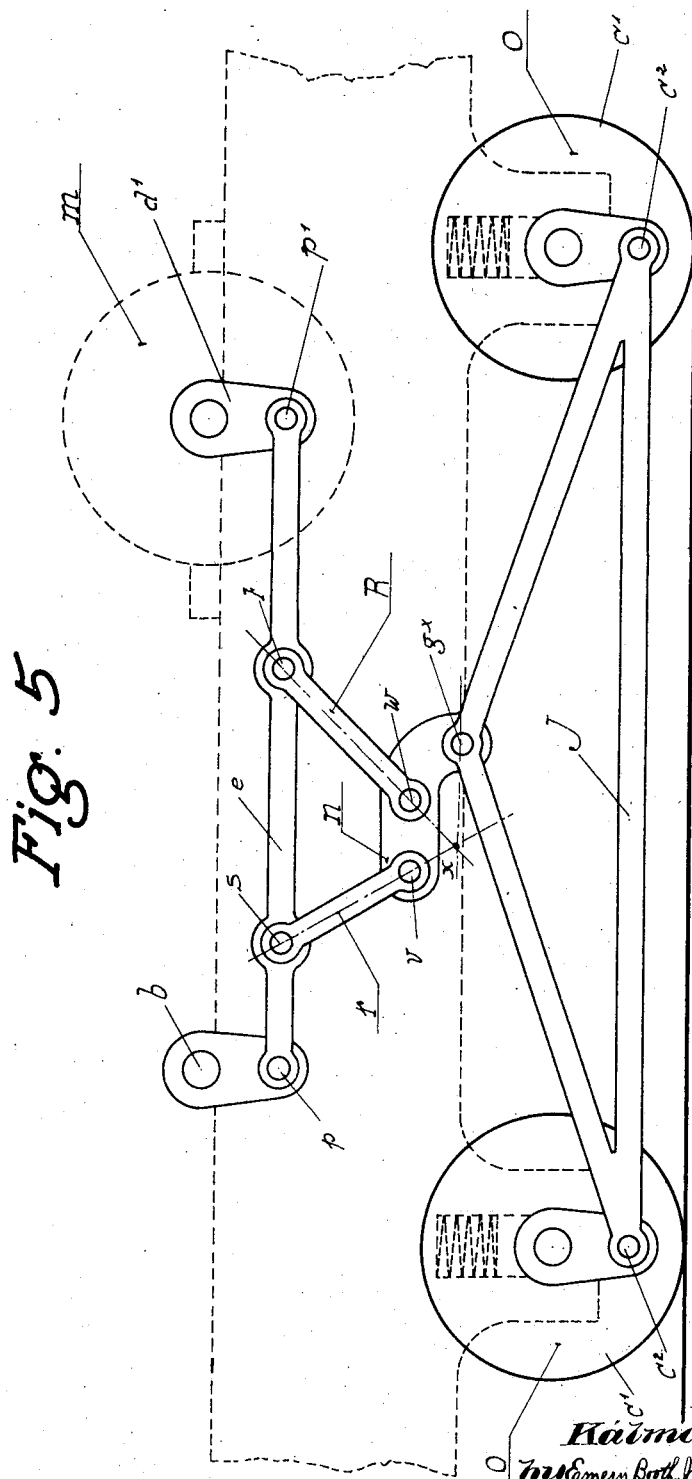

KALMAN v. KANDO, OF BUDAPEST, HUNGARY.

CRANK-GEAR FOR MOTOR-DRIVEN VEHICLES.

1,388,344.

Specification of Letters Patent. Patented Aug. 23, 1921.

Application filed September 17, 1920. Serial No. 411,016.

(GRANTED UNDER THE PROVISIONS OF THE ACT OF MARCH 3, 1921, 41 STAT. L., 1313.)

*To all whom it may concern:*

Be it known that I, KALMAN VON KANDO, a citizen of the Kingdom of Hungary, residing at Budapest, in the Kingdom of Hungary, have invented certain new and useful Improvements in Crank-Gears for Motor-Driven Vehicles, (for which I have filed applications in Hungary, Aug. 30, 1916; Germany, Aug. 30, 1917; Austria, May 19, 1919; Italy, Jan. 15, 1920;) of which the following is a specification.

My invention relates to crank gears, for motor driven vehicles of the type comprising motors arranged above the locomotive axles and provided with crank shafts driving the locomotive axles by means of connecting rods and cranks.

Referring to the drawing:

Figure 1 is a diagrammatic view of one of the well known types of crank-gears;

Fig. 2 is a diagrammatic view of another form of crank-gear wherein two or more motors are employed, yet not necessitating the use of an auxiliary crank shaft;

Fig. 3 illustrates a slightly different arrangement of the latter type of gear;

Fig. 4 is a diagrammatic view of a crank-gear embodying my invention; and

Fig. 5 illustrates a modified form of the invention.

Referring to Fig. 1, $m$ is an electromotor mounted on the frame $a$ of the locomotive above the axles $c, c$. The crank $d$, of the shaft $d_1$ of the motor $m$ is connected by means of a coupling rod $y$ to the crank $b_1$ of an auxiliary shaft $b$ journaled in the car-frame $a$ in the same level with the axles $c, c$. These axles are provided with cranks $c_1, c_1$, the crank pins $c_2, c_2$, of which are connected with each other by means of a coupling rod $e$, to which is linked at $e_1$ a coupling rod $e_2$ connected to the crank pin $b_2$.

This arrangement has the disadvantage of requiring an auxiliary crank shaft $b$.

According to the constructions shown in Figs. 2 and 3, the cranks $d_1$ of the shafts $d$ of the motors $m_1$ and $m_2$ are coupled by means of a rigid driving frame $l$ (Fig. 2) or by means of a driving frame composed of link-rods $f$ (Fig. 3) and extending downward to the level of the crank pins of the locomotive axles.

The coupling rods $i$ connect the crank pin $c_2$ of the axles $c$ with the pins $h$ of the driving frame arranged in the same level with the cranks pins $c_2$. It is however necessary to provide a lateral guide for the driving frames in order to prevent their lateral oscillations if the bearings have become somewhat worn. To this purpose the driving frame had to be connected to the crank pin $g$ of the middle axle and to allow the vertical displacement of the frame $a$ with respect to the axles, the connection had to be made by means of a sliding block $k$. It may be understood, that the driving frame is completely rigid against vertical forces, even with the arrangement shown in Fig. 3, as the cranks of the crank-gears arranged on the other side of the locomotive have to be shifted 90° with respect to the cranks of the side of the locomotive shown in the drawing, whereby any change of the angle formed by the two rods $f$ of the driving frame is prevented.

Though the arrangement shown in Fig. 2 or 3 avoids the necessity of an auxiliary crank shaft, it has to reckon with the drawbacks of the sliding blocks $k$, caused by the circumstance that owing to the centrifugal force, the sliding faces of the block $k$ cannot be conveniently lubricated and constructive difficulties prevent their convenient protection.

According to my invention I avoid all these drawbacks, providing neither auxiliary crank shafts, nor sliding blocks, but using only rods linked together by means of solid bearings.

With reference to Fig. 4 $m$ and $m_1$ are two electric motors mounted on the locomotive frame $a$ supported by springs $q$ on the axles $c, z, c.$  $d, d$, are the respective shafts of the motors $m, m_1$ provided at their ends with cranks $d_1$, and crank pins $p, p_1$.

The crank pins $p, p_1$ of the motors are coupled with each other by means of a coupling rod $e$.  $c, z$ and $c$ are the axles of the locomotive provided with cranks $c_1, z_1, c_1$ and crank pins $c_2, g, c_2$ respectively. Journaled on the crank pin $g$ of the middle axle $z$, located underneath and between the two motors is the driving lever $n$.

$r$ and R are two rods pivotally connecting the coupling rod $e$ of the cranks of the motor shafts with the driving lever $n$ and linked to this latter by means of the joints $v$ and $w$. According to Fig. 4 the rods $r$ and R are linked by means of the journals $s$ and $t$ to the coupling rod $e$, but, it may be understood, that they could instead be linked directly to the crank pins $p$, $p_1$ respectively.

It is essential, that the lower ends of the rods $r$ and R should be linked at two different points $v$ and $w$ to the driving lever $n$, and that these pivots should be located in such a manner, that the intersection point $x$ of the central lines of the two rods $r$ and R converging downward should be located substantially in the same level with the pin $g$ on which the driving lever is journaled.

With my arrangement I am insuring the following effects:

The trapezoid frame $e$, $r$, R, $n$ is absolutely rigid against any relative horizontal displacement of the coupling rods $e$ and $j$, $j$, whereby the horizontal driving forces are transmitted quite as well to the crank pin $g$ of the driving wheel $o$, as with the crank-gears Figs. 2 and 3 hitherto used.

If however owing to the spring suspension of the frame $a$ the axle $z$ or the crank pin $g$ performs vertical displacements with respect to the frame $a$, or with respect to the coupling rod $e$, the driving mechanism will yield to these displacements.

Let us for sake of convenience consider the coupling rod $e$ as stationary and the crank pin $g$ as performing vertical displacements. At such movements of the crank pin $g$ the driving lever $n$ will perform a pivotal movement around the pin $g$ and the momentary center of rotation of the movement of the driving lever $n$ performing a vertical movement together with the crank pin and a rotation about this crank pin, will always coincide with the intersection point $x$. As however the point $x$ is in the same level with the crank pin $g$, the path of the pin $g$ will be practically a vertical one.

If the arrangement is such, that the coupling rod located nearer to the crank pin $g$ viz. the rod R forms a smaller angle with the horizontal, than the other rod $r$, the momentary center of rotation $x$ follows the vertical displacements of the crank pin $g$, performed by this latter due to the spring suspension. Hence the momentary center of rotation $x$ of the driving lever $n$ will always be substantially in the same level with the center of the crank pin $g$, allowing thereby the lever $n$ to yield to the vertical displacements of the crank pin $g$ through the whole range required by the spring suspension of the frame $a$, without causing any detrimental strains in the driving gear.

The details of the construction described with reference to Fig. 4 may be changed without departing from the scope of my invention.

In Fig. 4 I have, merely as an example shown the driving lever $n$ journaled on the crank pin $g$. This is however not necessary and it is only essential, that the pivot of the driving lever $n$ should be at the same level with the point of intersection $x$. The driving lever $n$ may be pivoted at any desired point of the driving member connected to the crank pins of the car-wheels such as at any point of the coupling rods $j$ of Fig. 4.

In Fig. 5 for instance the crank pins $c_2$ of the wheels $c_1$ are coupled by means of the rigid coupling-frame J acting as driving member and the driving lever $n$ is pivoted by means of the pin $g^x$ on the said coupling-frame J at a higher level, than the crank-pins $c_2$. However the pivot $g^x$ is in the same level with the point of intersection $x$.

In Fig. 5 I have further shown only one motor $m$ and an idle crank-shaft $b$ coupled with the crank $d'$ of the motor by means of the coupling rod $e$. The pivots $s$ and $t$ are not herein arranged in the lines connecting the pivots $v$—$p$ and $w$—$t$ respectively as in Fig. 4, but this latter arrangement is preferable in order to avoid strains of flexure.

What I claim is:

1. In a vehicle, axles, a frame, vertically yielding connections between said axles and said frame, crank-shafts positively coupled in parallel journaled on said frame motors driving said crank-shafts mounted on said frame, cranks on said axles, a driving-member connected to said cranks, a driving-lever journaled to said driving-member, downwardly converging connecting rods pivotally linked at their upper ends at two different points to the positive coupling-member of the crank-shafts journaled on the frame and pivotally linked at their lower ends to two different points of said driving-lever.

2. In a vehicle, axles, a frame, vertically yielding connections between said axles and said frame, crank-shafts positively coupled in parallel journaled on said frame, motors driving said crank-shafts mounted on said frame, cranks on said axles, a driving-member connected to said cranks, a driving-lever journaled to said driving-member, downwardly converging connecting rods pivotally linked at their upper ends at such two different points to the positive coupling-member of the crank-shafts journaled on the frame and pivotally linked at the lower ends to such two different points of said driving-lever, that the point of intersection of the lines connecting the upper and lower pivots of the two connecting rods respectively is substantally in the same level with the journal of the driving-lever on the driving-member.

3. In a vehicle, axles, a frame, vertically yielding connections between said axles and said frame, crank-shafts positively coupled in parallel journaled on said frame, motors driving said crank-shafts mounted on said frame, cranks on said axles, a driving-member connected to said cranks, a driving-lever journaled to said driving-member, downwardly converging connecting rods pivotally linked at their upper ends at such two different points to the positive coupling-member of the crank-shafts journaled on the frame and pivotally linked at their lower ends to such two different points of said driving-lever, that the connecting rod located nearer to the journal of the driving-lever on the driving-member forms a smaller angle with the horizontal, than the other connecting rod.

4. In a vehicle, axles, a frame, vertically yielding connections between said axles and said frame, crank-shafts positively coupled in parallel journaled on said frame, motors driving said crank-shafts mounted on said frame, cranks on said axles, a driving-member connected to said cranks, a driving-lever journaled to said driving-member, downwardly converging connecting rods pivotally linked at their lower ends to two different points of said driving lever, and pivotally linked at their upper ends to two points of the positive coupling-member of the crank-pins of the crank-shafts journaled on the frame, located in lines connecting said crank-pins with the lower pivots of the respective connecting rods.

5. In a vehicle, axles, a frame, vertically yielding connections between said axles and said frame, crank-shafts positively coupled in parallel journaled on said frame, motors driving said crank-shafts mounted on said frame, cranks on said axles, a driving-member connected to said cranks, a driving-lever journaled to said driving-member, downwardly converging connecting rods pivotally linked at their upper ends to the crank-pins of the crank-shafts journaled on the frame and pivotally linked at their lower ends to two different points of said driving-lever.

6. In a vehicle, axles, a frame, vertically yielding connections between said axles and said frame, crank-shafts positively coupled in parallel journaled on said frame, motors driving said crank-shafts mounted on said frame, cranks on said axles, a driving-lever journaled to the crank-pin of one of said axles, downwardly converging connecting rods pivotally linked at their upper ends to two points of the positive coupling-member of the crank-shafts journaled on the frame and pivotally linked at their lower ends to two different points of said driving-lever.

7. In a vehicle, axles, a frame, vertically yielding connections between said axles and said frame, crank-shafts positively coupled in parallel journaled on said frame, motors driving said crank-shafts mounted on said frame, cranks on said axles, a driving-member connected to said cranks, a driving-lever journaled to said driving-member, downwardly converging connecting rods pivotally linked at their upper ends at such two different points to the positive coupling-member of the crank shafts journaled on the frame and pivotally linked at their lower ends to such two different points of said driving-lever, that the point of intersection of the lines connecting the upper and lower pivots of the two connecting rods respectively is substantially in the same level with the journal of the driving-lever on the driving-member, and that the connecting rod located nearer to the journal of the driving-lever on the driving-member forms a smaller angle with the horizontal, than the other connecting rod.

In testimony whereof I affix my signature in presence of two witnesses.

KALMAN v. KANDO.

Witnesses:
S. B. VAUGHAN,
EUZ. HARRAM.